June 5, 1923.
A. U. AVERA
1,457,647
TRACTOR
Original Filed June 18, 1921   3 Sheets-Sheet 2
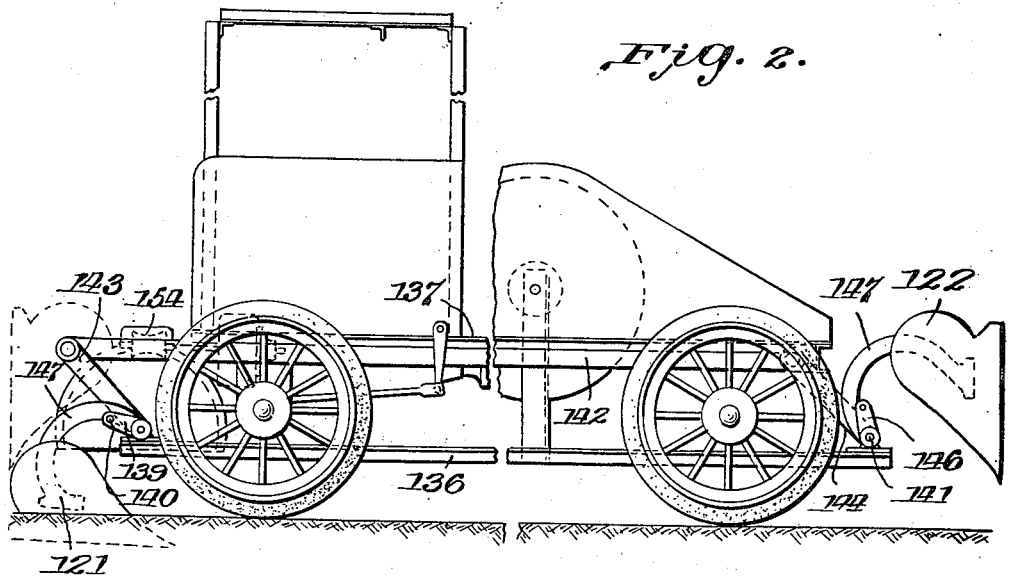
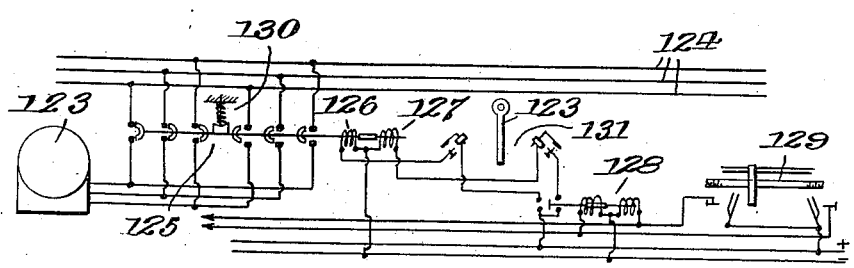
Inventor
Arch U. Avera
By Edward E. Clement
Attorney June 5, 1923.

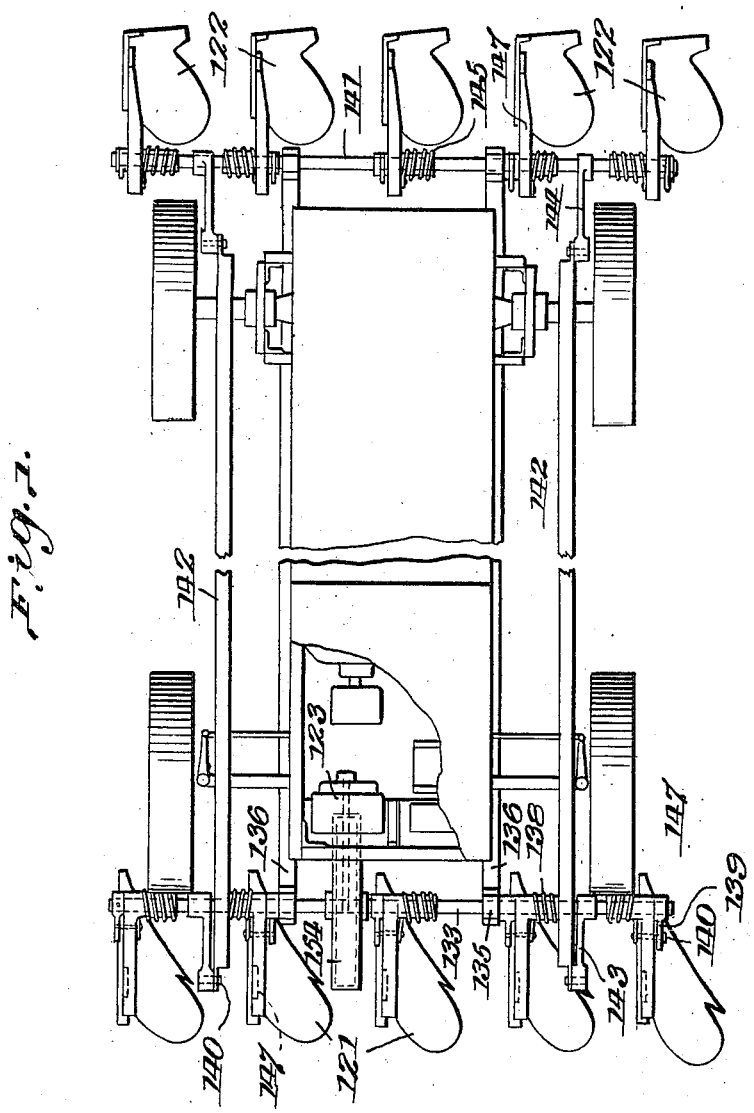

A. U. AVERA

TRACTOR

Original Filed June 18, 1921   3 Sheets-Sheet 3

1,457,647

Inventor
Arch U. Avera

By Edward E. Clement
Attorney

Patented June 5, 1923.

1,457,647

UNITED STATES PATENT OFFICE.

ARCH U. AVERA, OF FLORENCE, ALABAMA.

TRACTOR.

Original application filed June 18, 1921, Serial No. 478,610. Divided and this application filed July 13, 1922. Serial No. 574,725.

*To all whom it may concern:*

Be it known that I, ARCH U. AVERA, a citizen of the United States, residing at Florence, in the county of Lauderdale and State of Alabama, have invented certain new and useful Improvements in Tractors, of which the following is a specification, reference being had therein to the accompanying drawing.

My invention relates to motor driven traction implements, especially to those for agricultural use, such as plows and the like. It has for its object the provision of a compact and efficient device of this character, which may be either automatically or manually controlled, employing the principles set forth in my prior copending application filed June 18, 1921, Serial No. 478610, of which this application is a division.

Briefly and specifically stated, the present invention comprises a chassis mounted on four wheels, two of which are on connected knuckle joints for steering, with the usual compensating rod, steering link, steering arm, and worm gear, which may be driven either by a hand wheel for manually guiding the vehicle, or by an electric steering motor for automatic operation. On the chassis are mounted traction implements such as plows, which are so arranged as to automatically accommodate themselves to the back and forth travel of the machine in operation, that is to say those at one end assume operative position and those at the other end assume inoperative position at each reversal of travel of the machine as a whole. Provision is made for actuating and for holding the implements in either position in a stable manner and for permitting them to yield to obstructions or to overload conditions. Details of construction will appear from the description hereinafter.

My invention is illustrated in the accompanying drawings in which:

Fig. 1 is a top plan view of my machine showing plows carried at opposite ends.

Fig. 2 is a side elevation of the same machine.

Fig. 4 is a supplemental diagram of the controlling circuits for the reversing motor of the plows.

Figure 3:
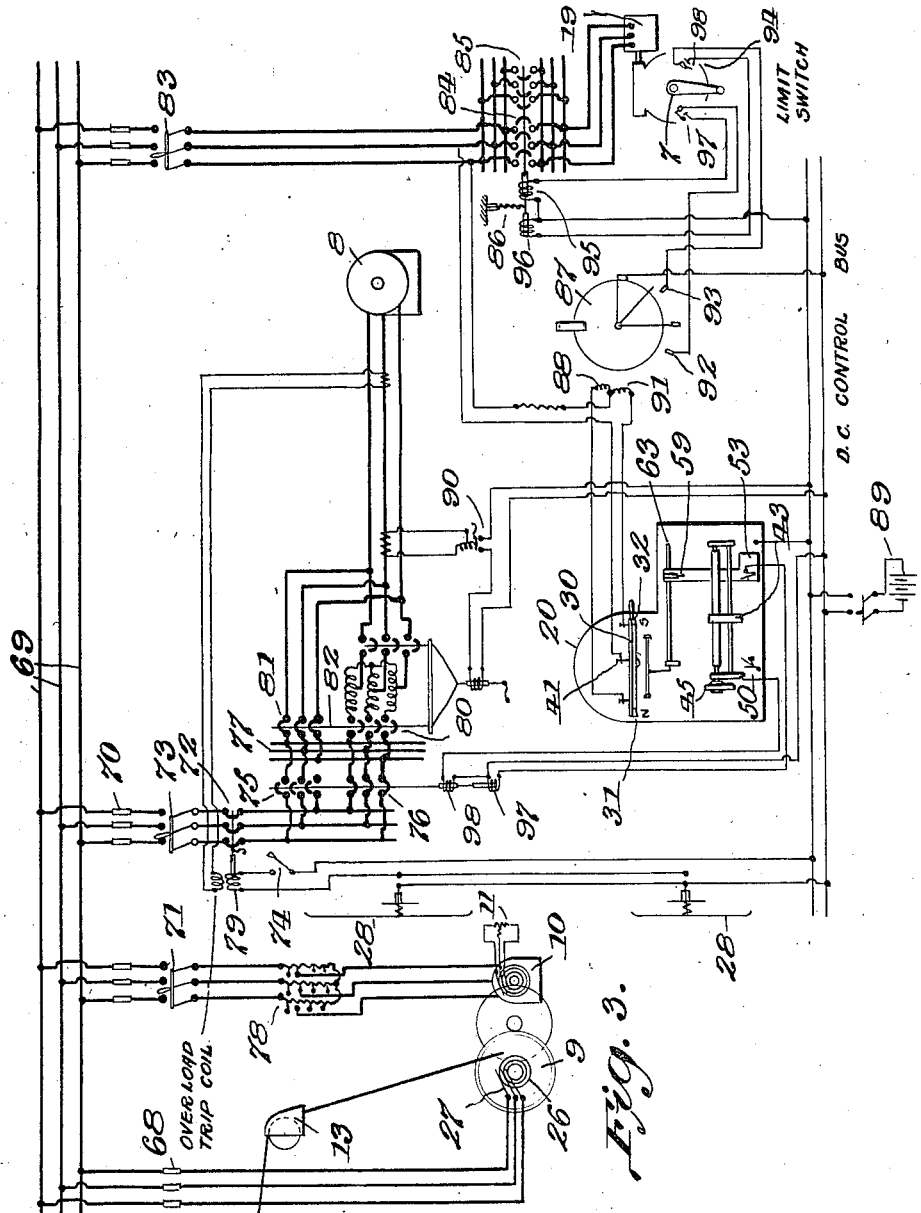
Fig. 3 is a diagram of the operating connections and circuits of the machine.

Referring to the drawings, it should first be stated that the controlling circuit shown in Fig. 4 has to do particularly with the present invention, and may be energized either from an outside circuit or by the power plant on the machine. General operating circuits for the machine are shown in Fig. 3, but not claimed herein, as they form the subject of a separate application filed concurrently herewith, Serial No. 574,724. In these circuits the power supply of the tractor starts with the 3-pole plug 17 attached to the stationary pole 15, where it is connected to the transmission line 16.

From the plug and socket the 3-phase electric power is conveyed through cable 14 to the cable drum 9 of the tractor, thence through the three contact rings 26 to connecting brushes 27, thence through protective fuses 68 to the main power bus 69 of the tractor.

Power for the motor 10 furnishing torque for the cable drum is tapped off this bus through fuses 70, a triple pole lever switch 71 and an auto-transformer 78 with taps for adjusting potential of the motor to obtain the desired tension on cable. The slip rings of the motor 10 are connected to resistances 11 of such value that the maximum torque occurs at or near zero speed. The action of this motor, then, is to maintain a certain torque on the cable drum, to pay out cable when its torque is exceeded by stress exerted when the tractor moves away from the fixed pole, or to take up cable when the tension is lowered by the tractor approaching the pole. At the time of maximum span of cable the cable drum will be nearly empty, giving the minimum radius, which radius (about 3 inches) determines the torque required for maintenance of strain on cable. As the tractor approaches the fixed end of cable the cable drum fills up, thereby exerting a smaller strain on cable. This condition is favorable, as at that time the span is shorter than before and the strain required is less. The size of motor required should be based on the maximum radius (about 3 inches) and a total over-all efficiency of 65 per cent more or less for gearing.

The main drive motor 8 receives its power through a main circuit breaker 72 located just inside the triple pole disconnecting switch 73. This breaker 72 normally is selfclosing, (but can be hand operated), and is opened by either of the guards 28 at front and rear of the machine, causing the closing of the circuit through the solenoid 79 by striking some stationary object, the circuit through solenoid 79 being supplied with power from the D. C. control bus connected to a suitable source of direct current such as the battery 89. If the tractor should jam against an obstruction so as to lock breaker 72 open the small single pole switch 74 is opened by hand, allowing the breaker to reclose for operation of main drive motor to back away from the obstruction.

Off the bus fed by circuit breaker 72 are fed the forward and reverse contactors 75 and 76. These, besides being hand operated, are also controlled by the reversing relay contacts 50—51 and 53—54, the left hand contacts being stationary while the right hand contacts are adjustable for the purpose of adjusting the point of reversal of the direction of rotation of the main drive motor and consequently the direction of travel of the tractor from a certain minimum travel up to about 1000 feet maximum travel, for this tractor.

The reversing contactors 75 and 76 feed another bus 77, which in turn, feeds the starting and running circuit breakers 80 and 81 respectively. This operation is in the usual sequence where a starting compensator is used. With no potential on the motor the starting breakers are in contact and the running breaker out of contact. When potential is applied, the relay 90 holds the starting potential on until the current has decreased to a certain point, when the starting compensator is cut out and the line potential thrown on. The starting and running breakers are mechanically interlocked as indicated by the bar 82 so as to make it impossible for both sets to be in contact at the same time.

The steering motor 19 takes its power from the power bus through a disconnecting switch 83 and a set of reversing contactors 84 and 85 normally held in an open position, by means of a spring and cam arrangement 86.

When the tractor is at an intermediate place in its travel, the contacts of the steering compass are both open as shown. If the machine varies its direction of travel off that for which the compass is set, terrestrial magnetism causes the needle contacts to form a more or less steady contact and when this has been maintained for a given length of time, during which time the alternating current time limit relay 87 makes contact, the solenoid 88 or 91 of the time element relay for the correction of travel necessary is energized and the steering motor guides the tractor until correction in direction of travel is accomplished, the time element relay 87 controlling the reversing contactors 84 and 85 through contacts 92—93, limit switch 94 and solenoids 95 and 96.

The principle of operation of the time element relay 87 is the same as the commercial induction type relay and induction type watt hour meter used on single phase circuits.

In order to prevent the steering wheels being turned at too great an angle, I provide limit switch 94 connected as indicated with the steering gear 70 to open one or the other of the contacts 97 or 98 when the steering wheels are turned to a predetermined limit to the right or left as the case may be.

The object for the insertion of the adjustable time element relay in the control circuit is that, with the very close setting necessary for the compass contacts, the vibrations of the tractor will cause contacts of brief duration to occur, the time length of these contacts about equalling each other at the opposite ends of the needle. The relay allows these contacts to be repeated indefinitely without affecting the steering motor 19. However, when the direction of travel of the tractor varies for a time longer than that for which the relay 87 is set, then the length and strength of the contacts at one end of the needle will be much greater than the length and strength of those at the other end, or a continuous contact will be maintained at one point, with the result that the time element relay will have time to act and energize the correct solenoid 95 or 96 for returning the direction of travel to normal.

When the tractor reaches the limit of travel for which the contacts 50—51 and 53—54 are set, the following results are accomplished in the sequence given:

The cam block 43 and with it the cam 65 passes to the right of the cam 59 which because of its one-way swinging joint snaps back into place with no operative effect. At this instant the lower end of the cam block 43 engages the arm 52 causing the reversing relay contacts 53—54 to close, reversing the direction of travel of the tractor. This reversal is effected through the energization of the solenoid 97. The latter part of this cam action allows the tractor to resume its original direction of travel, its location being changed so as to plow a new set of furrows parallel to and a certain given distance from the previous furrow. This change of location or off-setting of the plow is effected by the return movement of the cam block which in passing to the left of the cam 59 pushes it back against the tension of its retractile spring, which motion is transmitted through the tie rod 63, to the left hand cam 58 and thence through the linkage 60 to the compass box 35, the compass box being returned to its original set position under tension of the cam retractile spring after the cam block has passed out of engagement with the cam 59. Similarly, when the tractor reaches the other end of its predetermined length of travel, the contacts 50—51 and cam 58 are actuated to reverse the direction of travel and offset the machine into another line parallel to the preceding.

When the automatic guiding and reversing features are not desired the steering motor, steering compass, time element relay and accessories may be omitted. All other elements, including the transmission cable, cable drum and motor, main drive motor, and hand steering wheel will be included.

Referring now to Figs. 1 and 2, I show therein a preferred form of reversible plow arrangement for the tractor. The reversible effect is here obtained by the use of two sets of plows 121 and 122 set to operate in opposite directions, and arranged to be automatically raised and lowered at opposite ends of the tractor according to its direction of travel by means of an electric motor 123. This motor (Fig. 4) is connected to a polyphase power bus 124 on the tractor, through a reversing contactor 125 which stands in an open position when there is no current on the control coils 126 and 127. These control coils receive their excitation through a double pole relay 128 which, in turn, is operated by the control current from the reversing mechanism 129, which controls the main drive motor, not shown. The reversing contactor 125 is held in open position by means of the spring and cam arrangement 130. When the tractor has completed the distance of travel for which the reversing mechanism 129 is set, the said reversing mechanism operates and energizes the double pole relay 128, which, after it is thrown into one or the other pair of contacts, stands thereafter with contacts closed. This relay energizes the operating coils of the motor control contactors 125 causing the motor to raise one set of plows and lower the other. The double pole relay 128 causes the plow motor to continue its revolution even after the reversing mechanism has reopened after the travel of the tractor has reversed. The plow operating motor 123 then continues its running until the limit switch 131 is opened by an arm 132 attached to the plow shaft 133, thus opening the secondary control circuit through wire 134, allowing the plow motor contactor 125 to open and stop the motor.

Motion is transmitted from the motor 123 to the shaft 133 through a worm and sector connection 154, the shaft 133, being carried in journals 135 mounted on a subframe 136 hung from the tractor frame 137. The plows 121 are loosely mounted or journalled on the shaft 133 and resiliently connected therewith through heavy coil springs 138 which are so connected as to tend to rotate the plows downwardly, the downward movement of the plows being limited by the limit cranks 139 fastened to the shaft and engaging the under side of the plow hooks 147 through pins 140 carried by the limit cranks. Thus when the shaft 133 is rotated to move the limit cranks downwardly through a perdetermined angle as determined by the limit switch 131, the plow hooks 147 are resiliently held against the limiting pins 140 under tension of the springs 138. The plow operating shaft 141 acts through springs 145 and limit cranks 146 in a manner similar in all respects to the connection of the plows 121, except that the springs 145 are connected so as to tend to rotate the plows in an opposite direction to that of the plows 121. In other words both sets of plows are tensioned downwardly. As indicated in Fig. 13, the plows are so connected through the cranks 143 and 144 and connecting rod 142 that one set of plows will be up when the other set is down.

The plow operating shafts are held in a stable position at the point at which the plow motor stops due to the fact that the pitch of the worm driving the sector is such as not to permit the sector to drive the worm.

I claim:

1. The combination with a power driven vehicle, of reversible driving means for driving the same in opposite directions, two sets of plows carried by said vehicle arranged to operate in opposite directions of travel of the vehicle, respectively, a second reversible driving means operable independently of said first driving means to raise one set of plows out of operative position, and lower the other set into operative position, and control means operable to simultaneously effect a reversal of both said driving means at each end of a predetermined limit of travel of the vehicle.

2. The combination with a power driven vehicle, of reversible driving means for driving the same in opposite directions, two sets of plows carried by said vehicle arranged to operate in opposite directions of travel of the vehicle, respectively, a second reversible driving means operable independently of said first driving means to raise one and lower the other of said sets of plows out of and into operative position respectively, control means operable to simultaneously effect a reversal of both said driving means at each end of a predetermined limit of travel of the vehicle, and means operable upon a predetermined extent of movement of said second driving means to interrupt its operations.

3. A power driven vehicle, means to reverse the direction of travel thereof without changing ends, two sets of implements carried thereby and adapted to operate in opposite directions, and means operated automatically and simultaneously with reversal of the direction of travel of the vehicle to render one set of implements operative and the other set inoperative for the new direction of travel.

4. A power driven vehicle, means to reverse the direction of travel thereof without turning end for end, two sets of implements connected to said vehicle and adapted to be alternately lowered and raised into and out of operative position, an electric motor for actuating said implements, a supply circuit therefor, and a reversing contactor adapted to reverse the motor connections to the supply circuit automatically in the reversal of travel of the vehicle.

5. A power driven vehicle, means to reverse the direction of travel thereof without turning end for end, two sets of implements connected to said vehicle and adapted to be alternately lowered and raised into and out of operative position, an electric motor for actuating said implements, a supply circuit therefor, a reversing contactor between said circuit and said motor, and mechanism for reversing said contactor when the direction of travel of the vehicle is reversed.

6. A power driven vehicle, means to reverse the direction of travel thereof without turning end for end, two sets of implements connected to said vehicle and adapted to be alternately lowered and raised into and out of operative position, an electric motor for lowering and raising said implements, a supply circuit therefor, a reversing contactor for said circuit, electrical control coils for said contactor and mechanism adapted to reverse the energization of said coils when the direction of travel of the vehicle is reversed.

7. A power driven vehicle, means to reverse the direction of travel thereof without turning end for end, two sets of implements connected to said vehicle and adapted to be alternately lowered and raised into and out of operative position, an electric motor for lowering and raising said implements, a supply circuit therefor, a reversing contactor for said circuit, normally open control coils for said contactor, a double pole relay controlling said coils and mechanism controlling the circuits of said relay in the reversal of travel of the vehicle.

8. A power driven vehicle, having a frame, parallel transverse shafts journalled on opposite ends of said frame, implements mounted on said shafts for reverse operation at opposite ends of the vehicle, spring connections between said implements and said shafts normally tensioning the implements toward their operative position, limit stops for said implements on the shafts, and means to reversely operate said shafts to throw one set of implements into operative position and the other set into inoperative position simultaneously.

9. A power driven vehicle having a frame, parallel shafts journalled in said frame, implements mounted on said shafts, tension springs connecting said implements and shafts, limit cranks for said implements on the shafts, actuating cranks for the shafts, a connecting rod for said actuating cranks, and means on the vehicle connected to one of said shafts for turning the said shafts in opposite directions.

10. A power driven vehicle having a frame, parallel shafts journalled in said frame, implements mounted on said shafts, tension springs connecting said implements and shafts, limit cranks for said implements on the shafts, actuating cranks for the shafts, a connecting rod for said actuating cranks, and a reversible motor on the vehicle with a worm and sector connection to said shafts.

11. A power driven vehicle having a frame, parallel shafts journalled in said frame, implements mounted on said shafts, tension springs connecting said implements and shafts, limit cranks for said implements on the shafts, actuating cranks for the shafts, a connecting rod for said actuating cranks, and a reversible motor on the vehicle with a worm and sector connection to said shafts, the pitch of said worm being such that the sector cannot drive the worm, whereby the implements on the shafts are always held in stable position at the point at which said motor stops.

In testimony whereof I hereunto affix my signature.

ARCH U. AVERA.